United States Patent
Francke

(10) Patent No.: US 10,543,793 B2
(45) Date of Patent: Jan. 28, 2020

(54) DECORATIVE PART AND METHOD FOR PRODUCING A DECORATIVE PART

(71) Applicant: Dr. Ing. h.c. F. Porsche Aktiengesellschaft, Stuttgart (DE)

(72) Inventor: Gesine Francke, Moensheim (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 144 days.

(21) Appl. No.: 15/811,703

(22) Filed: Nov. 14, 2017

(65) Prior Publication Data

US 2018/0141502 A1 May 24, 2018

(30) Foreign Application Priority Data

Nov. 18, 2016 (DE) .......... 10 2016 122 248

(51) Int. Cl.
| | |
|---|---|
| *B60R 13/02* | (2006.01) |
| *B32B 5/02* | (2006.01) |
| *B29C 45/16* | (2006.01) |
| *B29C 45/14* | (2006.01) |
| *B29L 31/30* | (2006.01) |

(52) U.S. Cl.
CPC ........ *B60R 13/02* (2013.01); *B29C 45/14688* (2013.01); *B32B 5/022* (2013.01); *B29C 45/1671* (2013.01); *B29L 2031/3041* (2013.01)

(58) Field of Classification Search
CPC ... B60R 13/02; B32B 5/022; B29C 45/14688; B29C 45/1671; B29L 2031/3041
See application file for complete search history.

(56) References Cited

U.S. PATENT DOCUMENTS

| | | | | | |
|---|---|---|---|---|---|
| 3,451,885 | A | * | 6/1969 | Klein | B32B 5/022 442/225 |
| 4,622,253 | A | * | 11/1986 | Levy | A41D 27/02 156/72 |
| 6,156,681 | A | * | 12/2000 | Tamaru | B01D 39/083 442/383 |
| 2014/0335307 | A1 | | 11/2014 | Muenstermann et al. | |
| 2019/0062968 | A1 | * | 2/2019 | Kim | D04H 1/12 |

FOREIGN PATENT DOCUMENTS

DE 102011056933 A1 6/2013

* cited by examiner

*Primary Examiner* — Patricia L. Nordmeyer
(74) *Attorney, Agent, or Firm* — Leydig, Voit & Mayer, Ltd.

(57) ABSTRACT

A decorative part for an interior trim of a motor vehicle includes a carrier layer and a covering layer. The covering layer is arranged on the carrier layer. The covering layer has a higher fraction of natural fibers than the carrier layer and is mechanically connected to the carrier layer by needle punching.

9 Claims, 1 Drawing Sheet

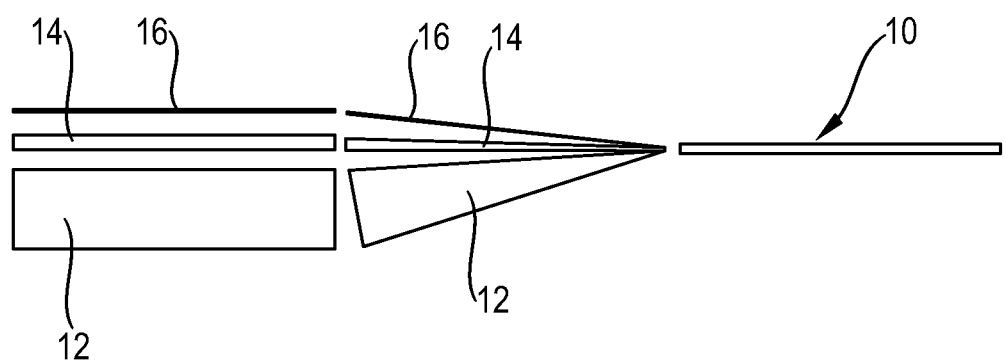

DECORATIVE PART AND METHOD FOR PRODUCING A DECORATIVE PART

CROSS REFERENCE TO RELATED APPLICATIONS

This application claims benefit to German Patent Application No. DE 10 2016 122 248.8, filed Nov. 18, 2016, the entire disclosure of which is hereby incorporated by reference herein.

FIELD

The invention relates to a decorative part and to a method for producing such a decorative part, by means of which an interior trim of a motor vehicle can be constructed.

BACKGROUND

DE 10 2011 056 933 A1 discloses an interior component for a motor vehicle, which comprises a fluid-jet-consolidated covering layer which has natural fibers and which can be adhesively bonded to a carrier layer.

SUMMARY

In an embodiment, the present invention provides a decorative part for an interior trim of a motor vehicle. The decorative part includes a carrier layer and a covering layer arranged on the carrier layer. The covering layer has a higher fraction of natural fibers than the carrier layer and is mechanically connected to the carrier layer by needle punching.

BRIEF DESCRIPTION OF THE DRAWINGS

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

The FIGURE shows a schematic side view of a decorative part during the production.

DETAILED DESCRIPTION

There is a constant requirement to design an interior trim of a motor vehicle to be high-grade but cost-effective.

Embodiments of the invention provide a high-grade and lightweight interior trim of a motor vehicle and a method for making the same.

According to embodiments of the invention, decorative parts for an interior trim of a motor vehicle are provided, the decorative parts comprising a carrier layer and a covering layer arranged on the carrier layer, wherein the covering layer has a higher fraction of natural fibers than the carrier layer, wherein the covering layer is mechanically connected to the carrier layer, in particular by needle punching.

The covering layer, which points toward the interior of the motor vehicle, can offer a high-grade appearance as a result of the increased fraction of natural fibers. The natural fibers can be visible to a vehicle occupant and thereby stamp or at least codetermine the appearance. In particular, use can be made of high-grade and generally cost-intensive materials for the natural fibers, and the starting point for which can be a high customer acceptance and/or a particularly pleasing appearance. It is already sufficient here if the layer thickness of the covering layer is just thick enough to be able to create the desired appearance. A sufficient stability and strength of the decorative part can be achieved in particular only together with the carrier layer which, by comparison with the covering layer, can be produced from more cost-favorable materials and can have a lower weight. The material use of cost-intensive materials can thus be minimized without adversely affecting the high-grade appearance or the required stability.

The mechanical connection of the covering layer to the carrier layer makes it possible for the relative position of the covering layer with respect to the carrier layer to be fixed in an easy manner. For example, a mechanical connection of the covering layer to the carrier layer can be brought about by needle punching without here exerting relatively large forces on the decorative part to be produced. The mechanical connection can be produced substantially without unnecessary longitudinal and/or transverse extensions of the decorative part and the carrier part. Nonuniform layer thicknesses caused by extensions in the production of the decorative can thus be avoided. In particular, it is possible to press the decorative part, with the mechanical connection of the covering layer to the carrier layer making it possible to prevent the covering layer slipping relative to the carrier layer. Even when adhesively bonding the covering layer to the carrier layer, which involves thermoplastic fractions of the covering layer and/or of the carrier layer being melted, the mechanical connection can prevent one layer from being able to slide on the melted material of the other layer. The mechanical connection allows a uniform, planar and high-grade form shaping and surface shaping of the multipart decorative part even during subsequent production steps, with the result that a high-grade and lightweight interior trim of a motor vehicle is made possible.

Suitable materials for the covering layer and/or the carrier layer and of the natural fibers are specified in DE 10 2011 056 933 A1, the contents of which are hereby incorporated by reference herein. The decorative part is designed in particular to be dimensionally stable such that the decorative part can be installed without further carrier elements in the interior trim of the motor vehicle. In particular, the decorative part can be clamped, hooked and/or clipped with preferably metallic components of the interior trim. It is possible in principle for the decorative part to be additionally provided with an in particular metallic reinforcement, with the reinforcement being able to be provided in particular within the carrier layer or below the carrier layer on the side of the carrier layer pointing away from the covering layer. The mechanical connection can constitute in particular a positive connection of the covering layer with the carrier layer. For this purpose, it is possible, through the effect of a force, for example by means of stamping, for a part of the covering layer to be introduced into the material of the carrier layer and/or for a part of the carrier layer to be introduced into the material of the covering layer in order to bring about the positive mechanical connection. For this purpose, the effect of a force in a very small, in particular substantially punctiform, surface region of the covering layer and/or of the carrier layer may be sufficient, with the result that a relative movement of the covering layer on the carrier layer can be avoided. If both the covering layer and the carrier layer are produced at least partially from fibers, the presence of the fibers can be utilized during the production of the mechanical connection by the covering layer being mechanically connected to the carrier layer by needle punching. During needle punching, in particular harpoon-like needles can be punched through the material of the covering layer and/or of the carrier layer, which material is preferably initially formed by rather loosely connected fibers, with the result that fibers of one layer can be pressed into the material of the other layer and can preferably be looped with the fibers of the other layer.

In particular, natural fibers and/or synthetic fibers of the covering layer partially penetrate into the material of the carrier layer, wherein, in particular, the part of the natural fiber and/or synthetic fiber of the covering layer that penetrates into the material of the carrier layer forms a loop which loops around a part of the carrier layer. This results in a positionally fixed and positive mechanical connection between the covering layer and the carrier layer, said connection being able to be produced in particular by needle punching. A particularly strong positive connection can result in particular with a loop-type configuration of the fibers introduced into the material, with the result that even fibers without a scale structure afford an adequate connection. Consequently, use can be made in particular of synthetic fibers which can be produced for example from polyamide (PA) or polyester (PE). The synthetic fibers are preferably produced from polypropylene (PP).

The carrier layer and/or the covering layer are or is preferably designed as a textile fabric, in particular a nonwoven fabric, felt, woven fabric, knitted fabric or noncrimp fabric. The carrier layer and/or the covering layer thus have a sufficient number of fibers which can be easily connected to the respective other layer by needle punching.

The covering layer particularly preferably has a mass fraction $w_{DN}$ of natural fibers of $50\% \leq w_{DN} \leq 100\%$, in particular $75\% \leq w_{DN} \leq 90\%$, and a mass fraction $w_{DK}$ of synthetic fibers of $0\% \leq w_{DK} \leq 50\%$, in particular $10\% \leq w_{DK} \leq 25\%$, wherein the sum of the mass fraction $w_{DN}$ of natural fibers and the mass fraction $w_{DK}$ of synthetic fibers is at most 100%. Given the high fraction of natural fibers, the covering layer can have a particularly high-grade and pleasing appearance.

In particular, the carrier layer has a mass fraction $w_{TN}$ of natural fibers of $0\% \leq w_{TN} \leq 50\%$, in particular $15\% \leq w_{TN} \leq 25\%$, and a mass fraction $w_{TK}$ of synthetic fibers of $50\% \leq w_{TK} \leq 100\%$, in particular $85\% \leq w_{TK} \leq 75\%$, wherein the sum of the mass fraction $w_{TN}$ of natural fibers and the mass fraction $w_{TK}$ of synthetic fibers is at most 100%. Given the high fraction of synthetic fibers, the carrier layer can be produced in a particularly cost-effective manner. Furthermore, it is possible to design the carrier layer to be particularly stable and firm. In particular, if the synthetic fibers are at least partially melted in a subsequent production step, the carrier layer can have a stability and strength which is comparable to a plastic part with a solid construction.

The covering layer preferably has a grammage $G_D$ of $G_D \leq 600$ g/m$^2$, in particular $170$ g/m$^2 \leq G_D \leq 200$ g/m$^2$, and the carrier layer has a grammage $G_T$ of $G_T \geq 600$ g/m$^2$, in particular $1200$ g/m$^2 \leq G_T \leq 2000$ g/m$^2$. The fraction of cost-intensive high-grade natural fibers in the decorative part can thus be kept low, whereas the fraction of cost-effective synthetic fibers in the decorative part can be high. The covering layer can be designed as a low-grammage nonwoven fabric and the carrier layer can be designed as a high-grammage nonwoven fabric. The mass occupancy of the carrier layer can be higher than the mass occupancy of the covering layer. In particular, the carrier layer has a greater thickness than the covering layer. The decorative part can thus have a higher fraction of cost-effective material of the carrier layer, with the result that the decorative part, in combination with a high-grade visible side provided by the covering layer, has a cost-effective structure.

In particular, the covering layer is provided with a protective layer on a surface pointing away from the carrier layer, wherein the protective layer is produced in particular from a protective film or a protective varnish. The protective layer is in particular substantially translucent, preferably transparent. The protective layer may also be designed to be opaquely concealing, with in particular the texture of the covering layer remaining perceptible to touch. The covering layer is protected from damage by the protective layer. The protective layer can preferably prevent penetration of moisture into the covering layer, in particular of air moisture into the natural fibers. The protective layer can have a thickness in the µm range, for example 100-200 µm.

The covering layer and/or the carrier layer preferably have or has synthetic fibers produced from a thermoplastic, in particular PP, wherein the covering layer is connected to the carrier layer by means of at least partially melted synthetic fibers. The thermoplastic of the synthetic fibers can be softened by a comparatively moderate input of heat, with the result that the synthetic fibers can produce an additional connection of the covering layer with the carrier layer in the manner of an adhesion promoter. In particular, the at least partially melted synthetic fibers can crosslink with one another within a layer and/or between the layers and thus bring about an adhesive bond. If the decorative part has cooled and the thermoplastic of the synthetic fibers has consolidated again, a particularly stable bond can be present which, in terms of its strength and stability, can correspond to a solid plastic part. In addition or alternatively, it is possible for there to be provided between the covering layer and the carrier layer an adhesive layer or a film of a plastic material, in particular PP, which can be melted with the input of heat, in order to connect the fibers of the covering layer and of the carrier layer to one another.

Embodiments of the invention further provide methods for producing a decorative part which can be designed and developed as described above, in which methods the covering layer is mechanically fastened to the carrier layer, in particular by needle punching, and subsequently the covering layer is pressed together with the carrier layer to reduce the layer thickness of the decorative part, in particular with simultaneous heat supply for melting synthetic fibers. The pressing operation makes it possible to increase the stability and the strength of the decorative part, with this effect being able to be increased further still by an in particular simultaneous melting of synthetic fibers. Here, the previously created mechanical connection between the covering layer and the carrier layer, in particular by needle punching, secures the correct relative position of the covering layer with respect to the carrier layer during the pressing operation. The mechanical connection allows a uniform, planar and high-grade form shaping and surface shaping of the multipart decorative part even during subsequent production steps, with the result that a high-grade and lightweight interior trim of a motor vehicle is made possible.

In particular, the covering layer is provided with a protective layer before or after the pressing operation. In particular if the protective layer is provided as a film, the protective layer can be connected to the covering layer during the pressing operation, with the result that a further production step is avoided. If the protective layer is sprayed on as a varnish, the varnish can be applied after the pressing operation, with the result that damage to the hardened varnish during the pressing operation is avoided.

The decorative part 10 illustrated in FIG. 1 has a relatively thick carrier layer 12 with a high grammage, on which there is placed a relatively thin covering layer 14 with a low grammage but a higher fraction of natural fibers. The covering layer 14 can be mechanically connected to the carrier layer 12, in particular by needle punching. In the exemplary embodiment illustrated, a transparent protective layer 16 in the form of a film is additionally applied to the covering layer 14. The layers 12, 14, 16 can subsequently be pressed together, with the result that the overall thickness of the decorative part 10 can be considerably reduced. Heat is preferably supplied during the pressing operation such that synthetic fibers in the covering layer 14 and/or in the carrier layer 16 can be melted in order to additionally adhesively bond the layers 12, 14, 16 to one another and to increase the strength and stability of the decorative part 10. After the pressing operation and an optionally provided cooling of the decorative part 10, the decorative part 10 can be installed in an interior trim of a motor vehicle.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A decorative part for an interior trim of a motor vehicle, comprising
   a carrier layer; and
   a covering layer arranged on the carrier layer;
   wherein the covering layer has a higher fraction of natural fibers than the carrier layer,
   wherein the covering layer is mechanically connected to the carrier layer by needle punching, and
   wherein the carrier layer has a mass fraction $w_{TN}$ of natural fibers of $15\% \leq w_{TN} \leq 25\%$, and a mass fraction $w_{TK}$ of synthetic fibers of $85\% \leq w_{TK} \leq 75\%$, wherein the sum of the mass fraction $w_{TN}$ of natural fibers and the mass fraction $w_{TK}$ of synthetic fibers is at most 100%.

2. The decorative part as claimed in claim 1, wherein natural fibers and/or synthetic fibers of the covering layer partially penetrate into the material of the carrier layer, and wherein the part of the natural fiber and/or synthetic fiber of the covering layer that penetrates into the material of the carrier layer forms a loop which loops around a part of the carrier layer.

3. The decorative part as claimed in claim 1, wherein the carrier layer and/or the covering layer is designed as a nonwoven fabric, felt, woven fabric, knitted fabric, or non-crimp fabric.

4. The decorative part as claimed in claim 1, wherein the covering layer has a mass fraction $w_{DN}$ of natural fibers of $75\% \leq w_{DN} \leq 90\%$, and a mass fraction $w_{DK}$ of synthetic fibers of $10\% \leq w_{DK} \leq 25\%$, wherein the sum of the mass fraction $w_{DN}$ of natural fibers and the mass fraction $w_{DK}$ of synthetic fibers is at most 100%.

5. The decorative part as claimed in claim 1, wherein the covering layer has a grammage $G_D$ of 170 g/m²$\leq G_D \leq$200 g/m², and wherein the carrier layer has a grammage $G_T$ of 1200 g/m²$\leq G_T \leq$2000 g/m².

6. The decorative part as claimed in claim 1, wherein the covering layer is provided with a protective layer on a surface pointing away from the carrier layer, wherein the protective layer is produced in particular from a protective film or a protective varnish.

7. The decorative part as claimed in claim 1, wherein the covering layer and/or the carrier layer has synthetic fibers which are produced from polypropylene, wherein the covering layer is connected to the carrier layer by at least partially melted synthetic fibers.

8. A method for producing a decorative part, the method comprising:
   mechanically fastening a covering layer to a carrier layer by needle punching, the covering layer having a higher fraction of natural fibers than the carrier layer; and
   subsequently pressing the covering layer together with the carrier layer to reduce a layer thickness of the decorative part with simultaneous heat supply for melting synthetic fibers,
   wherein the carrier layer has a mass fraction $w_{TN}$ of natural fibers of $15\% \leq w_{TN} \leq 25\%$, and a mass fraction $w_{TK}$ of synthetic fibers of $85\% \leq w_{TK} \leq 75\%$, wherein the sum of the mass fraction $w_{TN}$ of natural fibers and the mass fraction $w_{TK}$ of synthetic fibers is at most 100%.

9. The method as claimed in claim 8, wherein the covering layer is provided with a protective layer before or after the pressing operation.

* * * * *